US010733067B1

(12) United States Patent
Tandon et al.

(10) Patent No.: US 10,733,067 B1
(45) Date of Patent: Aug. 4, 2020

(54) APPARATUS, SYSTEM, AND METHOD FOR EFFICIENTLY DEPLOYING BACKUP VIRTUAL NETWORK DEVICES

(71) Applicant: Juniper Networks, Inc., Sunnyvale, CA (US)

(72) Inventors: Abhinav Tandon, Bangalore (IN); Kaustubh Shantanu, Bangalore (IN); Kamal Kumar Tiwari, Bangalore (IN); Siva Krishna Gudivada, Bangalore (IN); Kapil Rajendra Neeralgi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 181 days.

(21) Appl. No.: 15/953,425

(22) Filed: Apr. 14, 2018

(51) Int. Cl.
G06F 11/00 (2006.01)
G06F 11/20 (2006.01)
G06F 11/16 (2006.01)

(52) U.S. Cl.
CPC ...... *G06F 11/2025* (2013.01); *G06F 11/1658* (2013.01); *G06F 2201/815* (2013.01)

(58) Field of Classification Search
CPC .............. G06F 11/2033; G06F 11/2097; G06F 11/2038; G06F 11/1658; G06F 11/2025; G06F 11/2041; G06F 11/2071; G06F 11/3006; G06F 11/301
See application file for complete search history.

(56) References Cited

U.S. PATENT DOCUMENTS

| 2006/0259640 | A1* | 11/2006 | Bonsma | H04L 29/12113 |
| | | | | 709/245 |
| 2007/0078982 | A1* | 4/2007 | Aidun | G06F 11/2025 |
| | | | | 709/225 |
| 2017/0078152 | A1* | 3/2017 | Ahmed | H04L 12/4641 |

OTHER PUBLICATIONS

Cisco 6000; https://www.cisco.com/c/en/us/products/routers/network-convergence-system-6000-series-routers/index.html (Feb. 14, 2014).
Control plane; https://en.wikipedia.org/wiki/Control_plane (Feb. 8, 2008).
Understanding Disaggreated Junos OS; https://www.juniper.net/documentation/en_US/junos/information-products/ pathway-pages/ nfx-series/nfx250-jdm-user-guide.html (May 20, 2017).

* cited by examiner

*Primary Examiner* — Charles Ehne
(74) *Attorney, Agent, or Firm* — FisherBroyles, LLP (57) ABSTRACT

The disclosed method may include (1) identifying, within a virtual network, a primary virtual network device and a backup virtual network device that is to handle traffic directed to the primary virtual network device following a failure of the primary virtual network device, (2) installing, on the primary virtual network device, a first virtual controller that manages the primary virtual network device, (3) installing, on the backup virtual network device, a second virtual controller that manages the backup virtual network device, (4) directing, by the first virtual controller, the second virtual controller to replicate a state of the primary virtual network device, (5) detecting the failure of the primary virtual network device, and then in response to detecting the failure of the primary virtual network device, (6) directing, by the first virtual controller, the second virtual controller to facilitate handling the traffic directed to the primary virtual network device.

20 Claims, 6 Drawing Sheets

APPARATUS, SYSTEM, AND METHOD FOR EFFICIENTLY DEPLOYING BACKUP VIRTUAL NETWORK DEVICES

BACKGROUND

Virtualization may enable enterprises and individuals to provide flexible, efficient communication services for many users, networks, and/or computing devices. For example, an enterprise may create a virtual network device by emulating a physical network device via software running on a physical host. This virtual network device may perform the same functions as a physical network device but without the burden of being tied and/or limited to specific physical hardware. As a result, the enterprise may quickly and easily update the configuration or settings of the virtual network device (as well as generate new virtual network devices) in order to handle dynamically changing network demands.

Both physical network devices and virtual network devices may be paired with and/or connected to backup network devices. For example, a backup network device may be designed to become active following failures or malfunctions of a primary network device. In this way, the backup device may ensure that network traffic directed to the primary device is appropriately handled or forwarded. In a traditional backup deployment, a primary physical network device may send, to the operating system of a backup physical network device, state information and/or settings that enable the backup device to replicate and/or operate as the primary device.

Unfortunately, such a traditional backup deployment may be incompatible with virtual environments. For example, the operating system of a primary virtual network device may be separated and/or partitioned from a physical device that hosts the primary virtual network device. This separation and/or partition may prevent the primary virtual network device from identifying and/or communicating with other virtual network devices. As a result, the primary virtual device may be unable to facilitate generating and/or setting up a backup virtual device.

The instant disclosure, therefore, identifies and addresses a need for improved apparatuses, systems, and methods for deploying backup virtual network devices.

SUMMARY

As will be described in greater detail below, the instant disclosure generally relates to apparatuses, systems, and methods for efficiently deploying backup virtual network devices. In one example, a computer-implemented method for performing this task may include (1) identifying, within a virtual network, a primary virtual network device and a backup virtual network device that is to handle traffic directed to the primary virtual network device following a failure of the primary virtual network device, (2) installing, on the primary virtual network device, a first virtual controller that manages the primary virtual network device, (3) installing, on the backup virtual network device, a second virtual controller that manages the backup virtual network device, (4) directing, by the first virtual controller, the second virtual controller to replicate a state of the primary virtual network device such that the backup virtual network device is configured to handle the traffic directed to the primary virtual network device, (5) detecting, after the backup virtual network device is configured, the failure of the primary virtual network device, and then in response to detecting the failure of the primary virtual network device, (6) directing, by the first virtual controller, the backup virtual network device to begin handling the traffic directed to the primary virtual network device.

As another example, a system for implementing the above-described method may include various modules stored in memory. The system may also include at least one hardware processor that executes these modules. For example, the system may include (1) an identification module that identifies, within a virtual network, a primary virtual network device and a backup virtual network device that is to handle traffic directed to the primary virtual network device following a failure of the primary virtual network device, (2) an installation module that (A) installs, on the primary virtual network device, a first virtual controller that manages the primary virtual network device and (B) installs, on the backup virtual network device, a second virtual controller that manages the backup virtual network device, (3) a replication module that directs, by the first virtual controller, the second virtual controller to replicate a state of the primary virtual network device such that the backup virtual network device is configured to handle the traffic directed to the primary virtual network device, (4) a detection module that detects, after the backup virtual network device is configured, the failure of the primary virtual network device, and (5) a direction module that directs, by the first virtual controller in response to the failure of the primary virtual network device, the backup virtual network device to begin handling the traffic directed to the primary virtual network device.

As a further example, an apparatus for implementing the above-described method may include at least one storage device that facilitates execution of a primary virtual network device within a virtual network. The apparatus may also include at least one physical processing device communicatively coupled to the storage device, wherein the physical processing device (1) identifies, within the virtual network, a backup virtual network device that is to handle traffic directed to the primary virtual network device following a failure of the primary virtual network device, (2) installs, on the primary virtual network device, a first virtual controller that manages the primary virtual network device, (3) installs, on the backup virtual network device, a second virtual controller that manages the backup virtual network device, (4) directs, by the first virtual controller, the second virtual controller to replicate a state of the primary virtual network device such that the backup virtual network device is configured to handle the traffic directed to the primary virtual network device, (5) detects, after the backup virtual network device is configured, the failure of the primary virtual network device, and then in response to detecting the failure of the primary virtual network device, (6) directs, by the first virtual controller, the backup virtual network device to begin handling the traffic directed to the primary virtual network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for efficiently deploying backup virtual network devices. As will be explained in greater detail below, embodiments of the instant disclosure may facilitate communication between two or more virtual network devices within a virtual network. For example, the disclosed apparatuses, systems, and methods may install an instance of a virtual controller onto each virtual network device within a virtual network. Each virtual controller may be designed to identify and communicate with other virtual controllers across the various virtual network devices. After installation of these controllers, a virtual controller on one virtual network device may direct another virtual controller to orchestrate and/or generate a backup virtual network device. For example, a primary virtual controller may direct a backup virtual controller to dynamically (e.g., in real-time) synchronize the state of a primary virtual network device and the state of a backup virtual network device. In this way, the backup device may seamlessly and/or automatically begin handling network traffic directed to the primary device following a failure of the primary device.

Embodiments of the instant disclosure may also provide improved network redundancy within virtual environments. For example, by dynamically synchronizing the state of a primary virtual network device and a primary backup network device, the disclosed apparatuses, systems, and methods may reduce delays between a failure of the primary device and activation of the backup device. In addition, these disclosed apparatuses, systems, and methods may facilitate automatic deployment of virtual backup network devices, thereby reducing or eliminating the need for network administrators to manually deploy backup devices.

Furthermore, embodiments of the instant disclosure may enable network administrators to seamlessly and/or simultaneously monitor and/or control the states of multiple virtual network devices. For example, the disclosed apparatuses, systems, and methods may link and/or connect (via, e.g., an account accessible to an administrator) each virtual controller installed on a virtual network device within a virtual network. In this way, these disclosed apparatuses, systems, and methods may enable the administrator to manage operational settings of both a primary device and a backup device via a single access point.

The following will provide, with reference to FIGS. 1, 2, 4, and 5, detailed descriptions of exemplary systems and/or corresponding implementations for efficiently deploying backup virtual network devices. Detailed descriptions of corresponding computer-implemented methods will be provided in connection with FIG. 3. In addition, detailed descriptions of an exemplary computing system for carrying out these methods will be provided in connection with FIG. 6.

Figure 1:
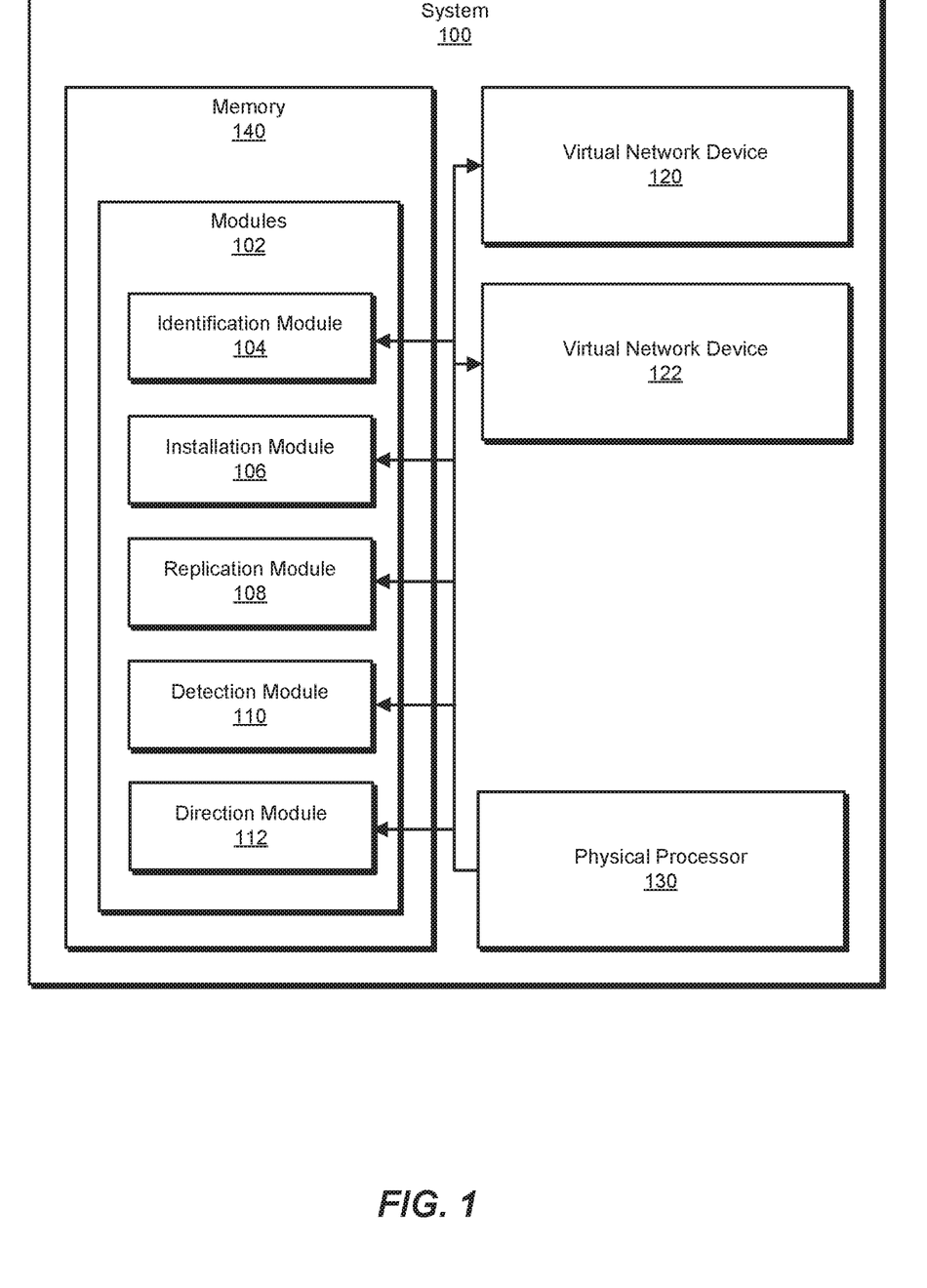
FIG. 1 is a block diagram of an exemplary system for efficiently deploying backup virtual network devices.

FIG. 1 is a block diagram of an exemplary system 100 for efficiently deploying backup virtual network devices. As illustrated in this figure, exemplary system 100 may include one or more modules 102 for performing one or more tasks. As will be explained in greater detail below, modules 102 may include an identification module 104, an installation module 106, a replication module 108, a detection module 110, and a direction module 112. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 206, virtual network device 120, and/or virtual network device 122). In addition, one or more of modules 102 may perform any of the functionality described herein in connection with any of the devices illustrated in FIG. 2. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate deploying one or more backup virtual network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more virtual network devices, such as virtual network device 120 and virtual network device 122. Virtual network devices 120 and 122 generally represent any type or form of virtual machine dedicated and/or programmed to receive, route, forward, and/or otherwise handle network traffic. In one embodiment, virtual network devices 120 and 122 may represent software-based emulations of physical network devices (e.g., routers, modems, switches, hubs, bridges, repeaters, gateways, multiplexers, network adapters, network interfaces, etc.). In this embodiment, virtual network devices 120 and 122 may be hosted by and/or on one or more physical computing devices. For example, virtual network device 120 may be hosted on one computing device, and virtual network device 122 may be hosted on a separate and/or distinct computing device. Alternatively, virtual network device 120 and virtual network device 122 may be hosted on the same physical computing device.

In one embodiment, virtual network device 120 may represent a primary virtual network device. The term "primary virtual network device," as used herein, generally refers to any main, initial, and/or original virtual network device that is assigned and/or directed to handle network traffic within a virtual network. In contrast, virtual network device 122 may represent a backup virtual network device. The term "backup virtual network device," as used herein, generally refers to any virtual network device that is assigned and/or directed to handle network traffic within a virtual network in the event that a corresponding primary virtual network device fails (e.g., is unable to perform one or more network operations). In the example of FIG. 1, virtual network device 122 may be designed and/or configured to take over and/or assume network tasks assigned to virtual network device 120 after a failure that prevents virtual network device 120 from performing these network tasks. In this example, virtual network device 122 may remain inactive (e.g., disabled and/or non-operational) until the failure of virtual network device 120 occurs or is detected.

Figure 2:
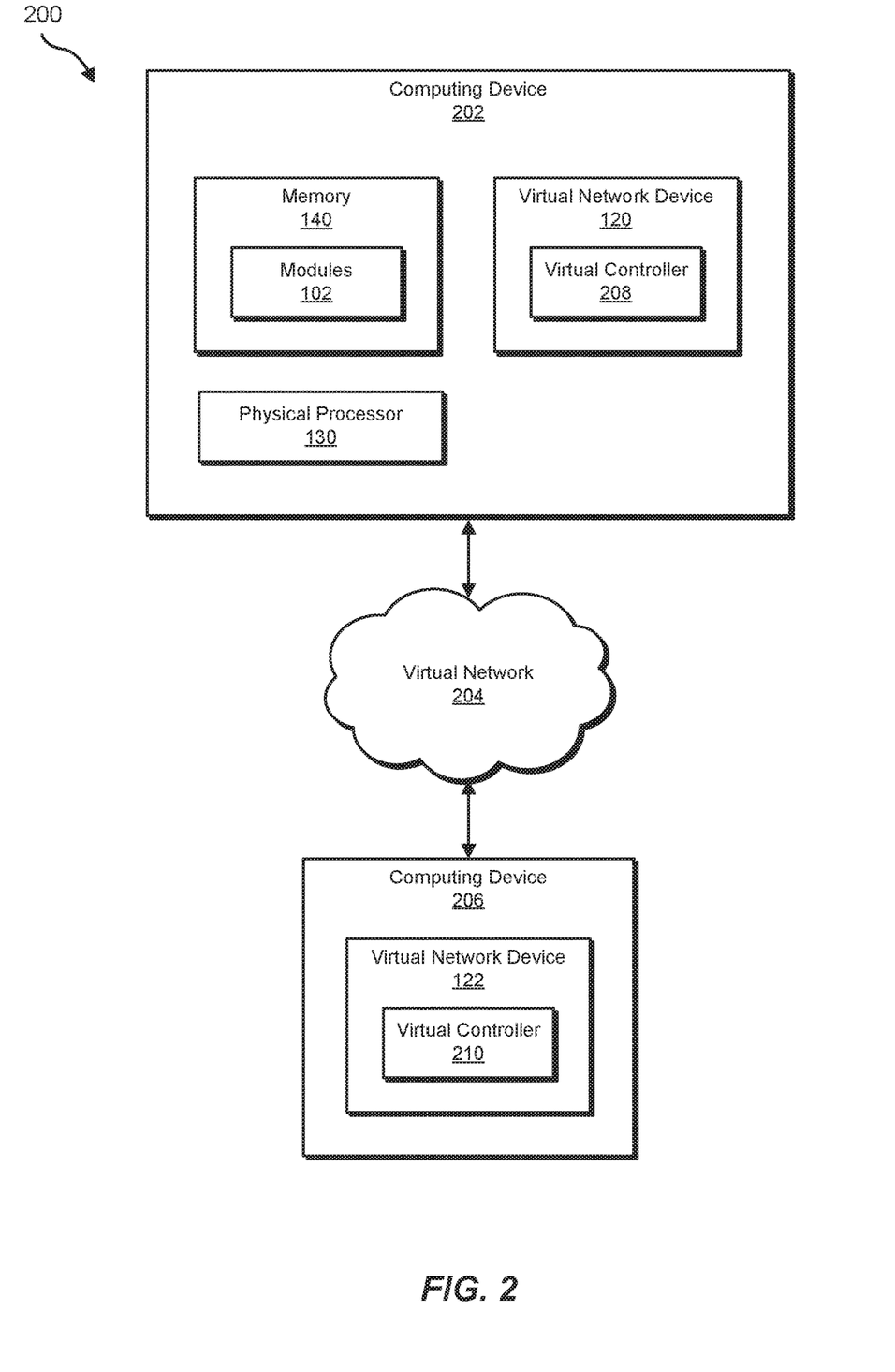
FIG. 2 is a block diagram of an additional exemplary system for efficiently deploying backup virtual network devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 and a computing device 206. In one example, all or a portion of the functionality of modules 102 may be performed by computing device 202 and/or computing device 206. As will be described in greater detail below, one or more of modules 102 from FIG. 1 may, when executed by at least one processor of computing device 202, enable computing device 202 to establish a backup virtual network device on computing device 206.

Computing devices 202 and 206 generally represent any type or form of physical computing devices capable of reading computer-executable instructions. In one example, computing devices 202 and 206 may include and/or represent physical host systems that operate and/or run one or more virtual network devices. In the example of FIG. 2, computing device 202 may host virtual network device 120 and computing device 206 may host virtual network device 122. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, routers (such as provider edge routers, hub routers, spoke routers, autonomous system boundary routers, and/or area border routers), switches, hubs, modems, bridges, repeaters, gateways, multiplexers, network adapters, network interfaces, variations or combinations of one or more of the same, and/or any other suitable computing devices.

Virtual network 204 generally represents any medium or architecture capable of facilitating communication or data transfer between two or more virtual network devices. In one example, virtual network 204 may facilitate communication between virtual network device 120 and virtual network device 122. Virtual network 204 may also facilitate communication between additional or alternative virtual network devices not illustrated in FIG. 2. Moreover, virtual network 204 may facilitate communication or data transfer using wireless and/or software-based connections.

Virtual network 204 may emulate and/or represent various types of network connections, such as an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to virtual network 204 in FIG. 2, virtual network devices 120 and 122 and computing devices 202 and 206 may each represent a portion of virtual network 204 and/or be included in virtual network 204.

As shown in FIG. 2, virtual network device 120 on computing device 202 may include a virtual controller 208. Similarly, virtual network device 122 on computing device 206 may include a virtual controller 210. The term "virtual controller," as used herein, generally refers to any type or form of program or application that runs, manages, and/or creates a virtual network device. In one embodiment, virtual controllers 208 and 210 may represent hypervisors dedicated to managing control planes of virtual network devices 120 and 122, respectively. In this embodiment, virtual controllers 208 and 210 may perform a variety of functions and/or services for virtual network devices 120 and 122, such as activating or deactivating virtual network devices 120 and 122, routing and/or forwarding network traffic for virtual network devices 120 and 122, and/or changing operational settings of virtual network devices 120 and 122.

In some embodiments, virtual controller 208 and virtual controller 210 may communicate with each other (via, e.g., virtual network 204). For example, virtual controller 208 and virtual controller 210 may represent and/or establish a so-called peering layer that facilitates efficient communication between virtual network device 120 and virtual network device 122. As will be explained in greater detail below, this communication may enable virtual controller 208 to establish and/or configure virtual network device 122 as a backup virtual network device for virtual network device 120.

In one embodiment, virtual controllers 208 and 210 may each represent a JUNIPER DEVICE MANAGER (JDM). In this embodiment, virtual network devices 120 and 122 may each represent a GUEST NETWORK FUNCTION (GNF).

Figure 3:
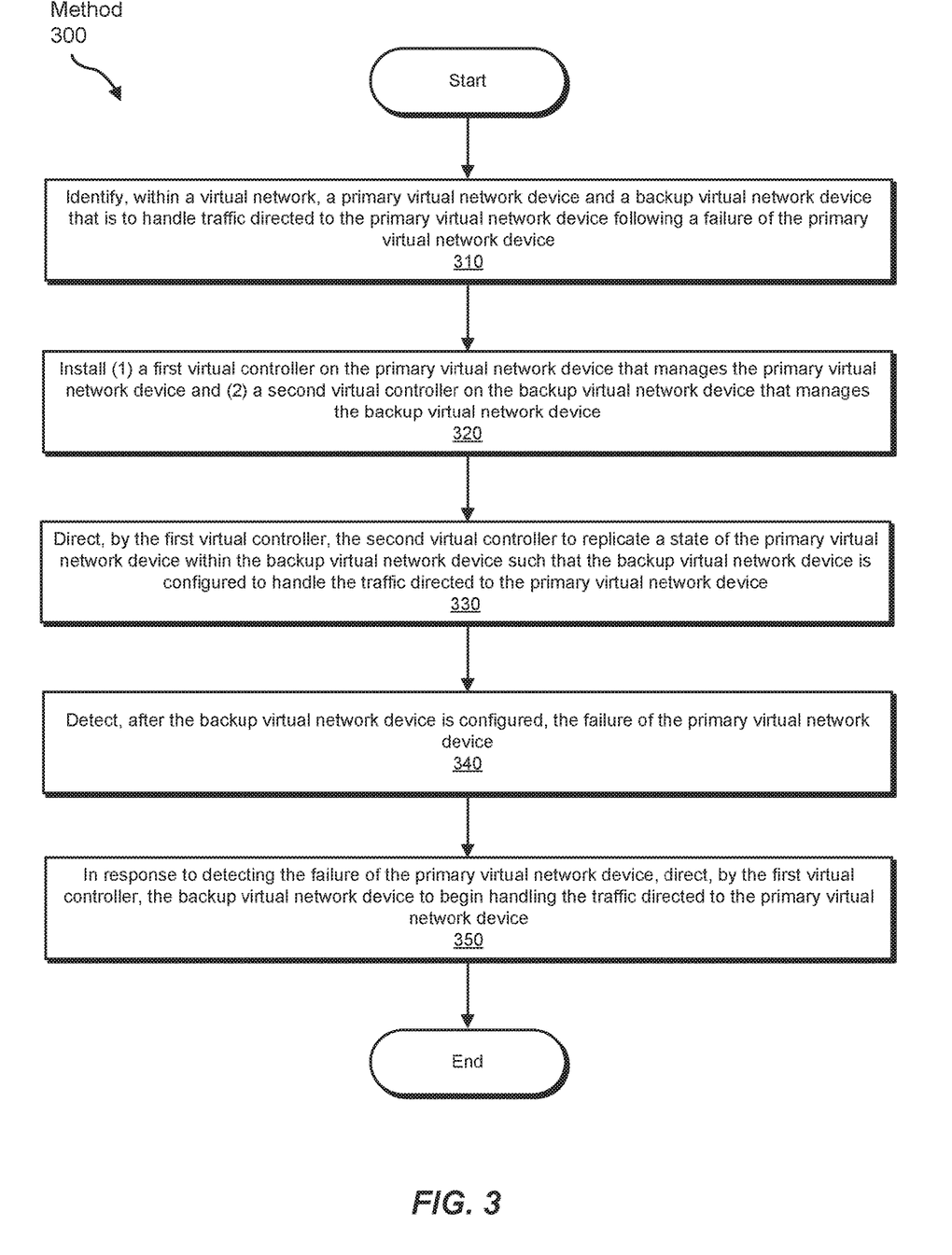
FIG. 3 is a flow diagram of an exemplary method for efficiently deploying backup virtual network devices.

FIG. 3 is a flow diagram of an example computer-implemented method 300 for efficiently deploying backup virtual network devices. The steps shown in FIG. 3 may be performed by any suitable computer-executable code and/or computing system, including system 100 in FIG. 1, system 200 in FIG. 2, implementation 400 in FIG. 4, implementation 500 in FIG. 5, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify, within a virtual network, a primary virtual network device and a backup virtual network device that is to handle traffic directed to the primary virtual network device following a failure of the primary virtual network device. For example, identification module 104 may, as part of computing device 202 in FIG. 2, identify virtual network device 120 and virtual network device 122 within virtual network 204. In one embodiment, identification module 104 may operate as part of virtual network device 120 (e.g., as part of virtual controller 208) within computing device 202. Additionally or alternatively, identification module 104 may operate external to virtual network device 120.

The systems described herein may perform step 310 in a variety of ways and/or contexts. In some examples, identification module 104 may identify virtual network device 120 within virtual network 204 after virtual network device 120 has been designated and/or programmed as a primary virtual network device. For example, virtual network device 120 may represent an existing primary virtual network device within virtual network 204.

In other examples, identification module 104 may determine that an administrator or user has requested virtual network device 120 to be generated and/or configured as a primary virtual network device within virtual network 204. In response to this request, identification module 104 may generate and/or configure virtual network device 120 within computing device 202 such that virtual network device 120 operates as a primary virtual network device. For example, identification module 104 may create virtual network device 120 by installing a software-based emulation of a physical network device onto computing device 202. In addition, identification module 104 may direct virtual network device 120 to operate as a primary virtual network device (as opposed to a backup virtual network device). For example, identification module 104 may direct virtual network device 120 to immediately begin handling traffic within virtual network 204.

In some embodiments, identification module 104 may determine that a user and/or administrator has directed and/or requested the creation of a backup virtual network device that is to handle traffic directed to virtual network device 120 following a failure of virtual network device 120. For example, identification module 104 may determine that the administrator has requested a backup virtual network device to be created for each primary virtual network device that is established within virtual network 204. In this example, identification module 104 may select and/or create a virtual network device on which to deploy a backup virtual network device for virtual network device 120. In one embodiment, identification module 104 may select virtual network device 122 by identifying a virtual network device within virtual network 204 that is not currently facilitating network traffic. As will be explained below, the disclosed systems may then configure and/or program virtual network device 122 such that virtual network device 122 is capable of operating as a backup virtual network device for virtual network device 120.

Returning to FIG. 3, at step 320 one or more of the systems described herein may (1) install, onto the primary virtual network device, a first virtual controller that manages the primary virtual network device and (2) install, on the backup virtual network device, a second virtual controller that manages the backup virtual network device. For example, installation module 106 may, as part of computing device 202 and/or computing device 206 in FIG. 2, install virtual controller 208 on virtual network device 120 and install virtual controller 210 on virtual network device 122.

The systems described herein may perform step 320 in a variety of ways and/or contexts. In some examples, all or a portion of the virtual network devices (including virtual network devices 120 and 122) within virtual network 204 may contain and/or be controlled by a virtual controller. For example, while each virtual network device within virtual network 204 is being created and/or established (by, e.g., identification module 104), installation module 106 may install a virtual controller onto each virtual network device.

In the example of FIG. 2, installation module 106 may install virtual controller 208 on virtual network device 120 and virtual controller 210 on virtual network device 122. Installation module 106 may install virtual controllers 208 and 210 at any point during the creation of virtual network devices 120 and 122. By installing virtual controllers 208 and 210 on virtual network devices 120 and 122, the disclosed systems may facilitate communication between virtual network device 120 and virtual network device 122, thereby enabling virtual network device 122 to be programmed and/or configured as a backup for virtual network device 120.

In some examples, a virtual controller installed on a virtual network device within virtual network 204 may be accessed and/or managed by an administrator of virtual network 204. For example, all or a portion of the virtual controllers installed on virtual network devices within virtual network 204 may be managed via and/or linked to an account accessible to the administrator. In this way, the administrator may manage each virtual controller via a single access point.

In some embodiments, such an account may enable the administrator to efficiently perform actions such as manually activating, deactivating, and/or managing operational settings for multiple virtual network devices. For example, an administrator may monitor and/or control the state of both virtual network device 120 and virtual network device 122 via the account. Specifically, the administrator may monitor certain parameters and/or metrics that indicate the health, status, and/or performance of virtual network device 120 and/or 122. Additionally or alternatively, the account may enable the administrator to simultaneously access command-line interfaces (CLIs) of virtual network device 120 and virtual network device 122. Accessing the CLI of virtual network devices 120 and 122 may facilitate performing all or a portion of the actions described above, as well as enable the administrator to provide any additional or alternative commands and/or prompts to virtual network devices 120 and 122.

Returning to FIG. 3, at step 330 one or more of the systems described herein may direct, by the first virtual controller, the second virtual controller to replicate a state of the primary virtual network device within the backup virtual network device such that the backup virtual network device is configured to handle the traffic directed to the primary virtual network device. For example, replication module 108 may, as part of virtual controller 208 hosted on computing device 202 in FIG. 2, direct virtual controller 210 to replicate a state of virtual network device 120 within virtual network device 122.

The term "state of a virtual network device," as used herein, generally refers to all or a portion of the software, hardware, operational settings, and/or memory content that is contained within and/or utilized by a virtual network device at a particular point in time. In some embodiments, at least a portion of the state of a virtual network device may be unique to that virtual network device (e.g., relative to other virtual network devices within the same virtual network). Accordingly, replicating the state of a certain virtual network device within another virtual network device may enable the other virtual network device to receive and/or handle network traffic directed to the certain virtual network device.

The systems described herein may perform step 330 in a variety of ways and/or contexts. In some examples, replication module 108 may send, to virtual controller 210 on virtual network device 122, information that enables virtual controller 210 to replicate the current state of virtual network device 120. For example, replication module 108 may send a profile of virtual network device 120. This profile may include various configuration details of virtual network device 120, such as a number and/or type of processors on computing device 202, an amount and/or type of memory on virtual network device 120, network interfaces utilized by virtual network device 120, System Management BIOS (SMBIOS) settings of virtual network device 120, and/or any additional type of setting or property of virtual network device 120.

Additionally or alternatively, replication module 108 may send a system image of virtual network device 120 to virtual controller 210. This system image may include and/or represent a copy of all or a portion of the data that virtual network device 120 stores and/or accesses at a particular point in time. In some examples, replication module 108 may also send virtual controller 210 information that enables virtual network device 122 to identify and/or communicate with virtual network device 120. For example, replication module 108 may send virtual controller 210 a routing engine slot number of virtual network device 120 and/or a name of an interface between virtual network device 120 and virtual network device 122. In general, replication module 108 may send virtual controller 210 any information that enables virtual network device 122 to begin performing all or a portion of the network tasks that are (or will be) assigned to virtual network device 120.

Replication module 108 may direct virtual controller 210 to replicate the state of virtual network device 120 in response to a variety of stimuli and/or contexts. In one embodiment, replication module 108 may direct virtual controller 210 to replicate the state of virtual network device 120 immediately after virtual network device 120 has been created, configured, and/or programmed. Additionally or alternatively, replication module 108 may direct virtual controller 210 to replicate the state of virtual network device 120 in response to all or a portion of the bootup operations of virtual network device 120.

In further examples, replication module 108 may direct virtual controller 210 to replicate the state of virtual network device 120 in response to changes in the configuration and/or settings of virtual network device 120. For example, replication module 108 may direct virtual controller 210 to replicate, within virtual network device 122, all or a portion of the changes that are made to settings and/or data (such as network interfaces and/or packet-filtering rules) utilized by virtual network device 120. In this way, replication module 108 may facilitate real-time synchronization between the state of virtual network device 120 and the state of virtual network device 122.

In some embodiments, replication module 108 may direct virtual controller 210 to designate virtual network device 122 as a backup virtual network device. For example, replication module 108 may instruct virtual controller 210 to remain silent within virtual network 204 (i.e., not handle network traffic) until being explicitly directed to activate.

Figure 4:
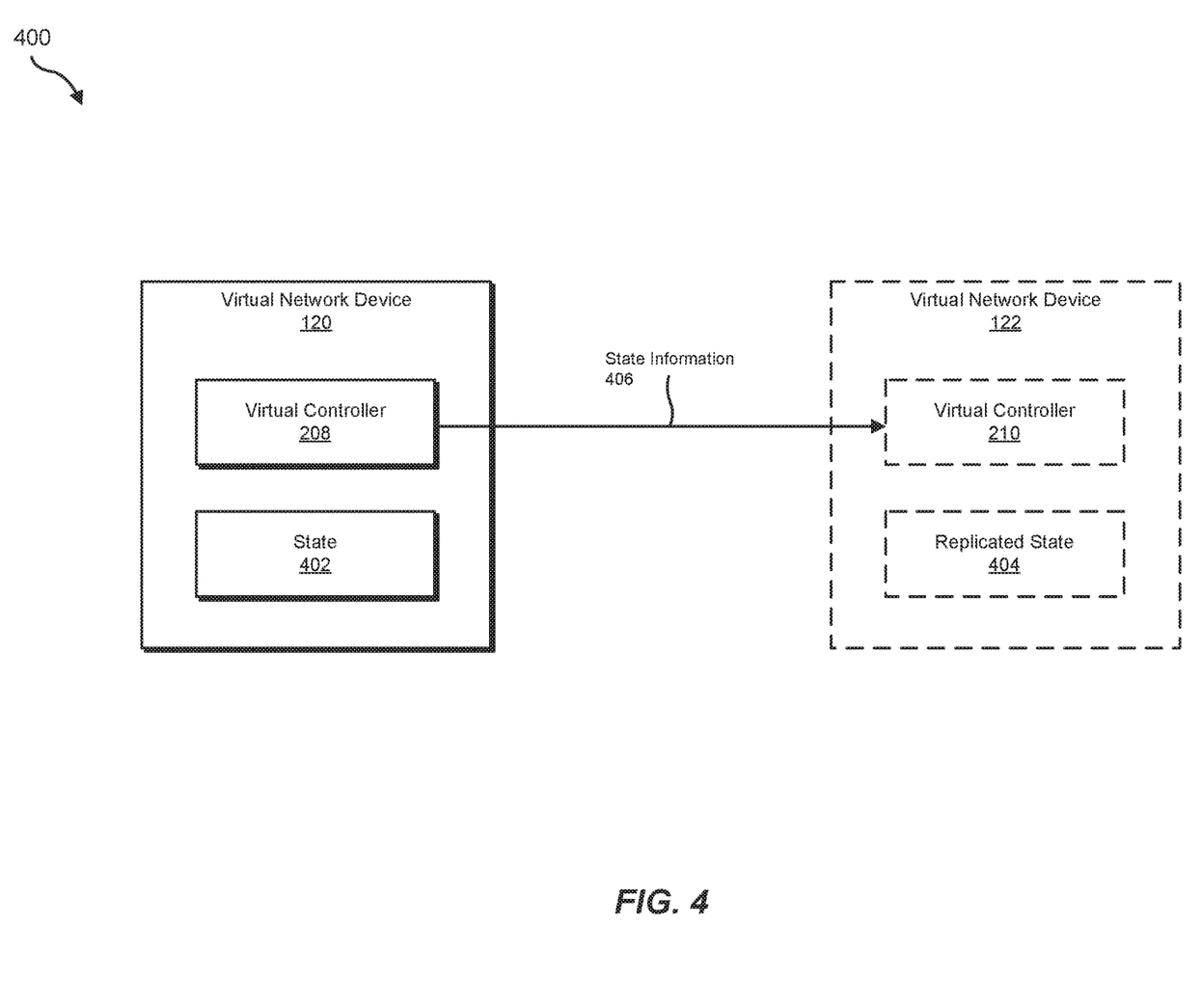
FIG. 4 is a block diagram of an exemplary implementation for efficiently deploying backup virtual network devices.

FIG. 4 illustrates an exemplary implementation 400 of virtual network devices 120 and 122. In implementation 400, a state 402 may correspond to the current state of virtual network device 120. State 402 may be described and/or represented by state information 406. As shown in FIG. 4, virtual controller 208 may send state information 406 to virtual controller 210. After receiving state information 406, virtual controller 210 may utilize state information 406 to generate a replicated state 404 within virtual network device 122. In some examples, replicated state 404 may be the same as and/or similar to state 402. Virtual controller 210 may generate replicated state 404 in a variety of ways, such as by copying all or a portion of state information 406 to virtual network device 122 and/or programming the settings of virtual network device 122 based on state information 406.

In implementation 400, virtual network device 122 is illustrated with dashed lines. These dashed lines may indicate that virtual network device 122 is not currently handling traffic within virtual network 204. For example, in implementation 400, virtual controller 210 may be waiting for an instruction from virtual controller 208 that directs virtual network device 122 to begin handling traffic. In this example, virtual network device 120 may be currently handling traffic within virtual network 204 (i.e., virtual network device 120 may not yet have experienced a failure).

Returning to FIG. 3, at step 340 one or more of the systems described herein may detect, after the backup virtual network device is configured, the failure of the primary virtual network device. For example, after virtual network device 122 is configured, detection module 110 may, as part of virtual controller 208 hosted on computing device 202 in FIG. 2, detect the failure of virtual network device 120.

The term "failure of a virtual network device," as used herein, generally refers to any problem, malfunction, and/or issue within a virtual network device that prevents the virtual network device from performing one or more network tasks. Examples of failures of a virtual network device include, without limitation, failures to accurately or efficiently receive, route, and/or forward traffic, failures to correctly enforce a packet-filtering rule, failures to respond to communications or instructions from a virtual controller, combinations or variations of one or more of the same, and/or any additional types of failures. Failures of a virtual network device may be caused by any type or form of malfunction within the virtual network device, including a malfunction of software executed by the virtual network device and/or a malfunction of hardware on the physical computing device that hosts the virtual network device.

The systems described herein may perform step 340 in a variety of ways and/or contexts. In some examples, detection module 110 may monitor virtual network device 120 to detect any failure within virtual network device 120 that prevents virtual network device 120 from performing one or more network tasks. For example, detection module 110 may continuously or periodically assess the performance and/or output of one or more components (e.g., ports, routing engines, forwarding engines, network interfaces, packet filters, etc.) within and/or associated with virtual network device 120. Upon detecting errors or other undesirable behaviors of these components, detection module 110 may determine that virtual network device 120 has failed.

Returning to FIG. 3, at step 350 one or more of the systems described herein may direct, by the first virtual controller in response to the failure of the primary virtual network device, the backup virtual network device to begin handling the traffic directed to the primary virtual network device. For example, direction module 112 may, as part of virtual controller 208 hosted on computing device 202 in FIG. 2, direct virtual network device 122 to begin handling traffic directed to virtual network device 120.

The systems described herein may perform step 350 in a variety of ways and/or contexts. In some examples, direction module 112 may instruct and/or signal virtual controller 210 to activate virtual network device 122 within virtual network 204. For example, direction module 112 may prompt virtual controller 210 to begin handling traffic received at virtual network device 122. In one embodiment, virtual controller 210 may have already replicated the state of virtual network device 120 within virtual network device 122 when virtual controller 210 receives this prompt. Thus, virtual network device 122 may seamlessly and/or immediately begin handling traffic directed to virtual network device 120.

In one example, direction module 112 may also direct virtual controller 208 within virtual network device 120 to deactivate and/or disable virtual network device 120 (e.g., in the event that the failure of virtual network device 120 has not already resulted in deactivation). Upon being deactivated or disabled, virtual network device 120 may no longer receive network traffic directed and/or addressed to virtual network device 120. Instead, other virtual network devices within virtual network 204 may direct this traffic to virtual network device 122. For example, because virtual controller 210 replicated the state of virtual network device 120 within virtual network device 122, virtual network device 122 may appear to be virtual network device 120 to the other virtual network devices. Specifically, virtual network device 122 may display and/or broadcast the same network device identifiers (such as a media access control (MAC) address, internet protocol (IP) address, port numbers, network interface names, etc.) as virtual network device 120, thereby enabling virtual network device 122 to receive traffic addressed to virtual network device 120.

Figure 5:
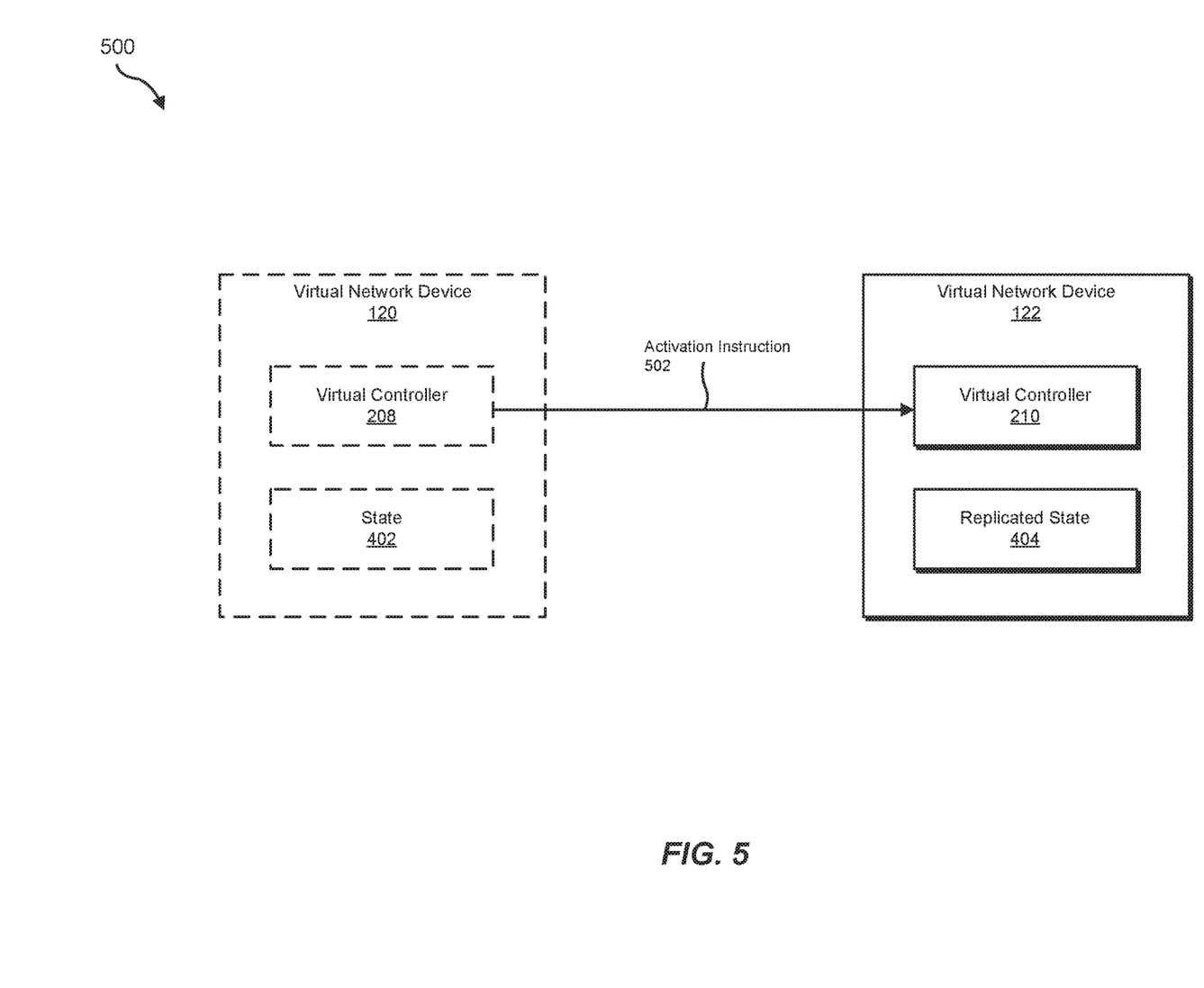
FIG. 5 is a block diagram of an additional exemplary implementation for efficiently deploying backup virtual network devices.

FIG. 5 illustrates an exemplary implementation 500 of virtual network devices 120 and 122. In this example, implementation 500 describes the state of virtual network devices 120 and 122 after virtual controller 208 has detected a failure of virtual network device 120. In response to detecting this failure, virtual controller 208 may send, to virtual controller 210, an activation instruction 502. This instruction may prompt virtual controller 210 to activate virtual network device 122 within virtual network 204. In addition, virtual controller 208 may deactivate virtual network device 120 within virtual network 204 (indicated by the dashed lines of virtual network device 120 within FIG. 5). In implementation 500, virtual network device 122 may begin handling traffic that is directed to virtual network device 120.

Virtual network device 122 may continue to handle traffic directed to virtual network device 120 for any suitable amount of time. In one example, virtual network device 122 may continue to handle traffic directed to virtual network device 120 until the failure of virtual network device 120 has been corrected, thereby enabling virtual network device 120 to properly resume network operations within virtual network 204. Additionally or alternatively, virtual network device 122 may continue to handle traffic directed to virtual network device 120 until virtual network device 122 experiences a failure. In the event of a failure of virtual network device 122, virtual network device 120 (or any other suitable virtual network device within virtual network 204) may resume or begin handling the traffic directed to virtual network device 120.

Figure 6:
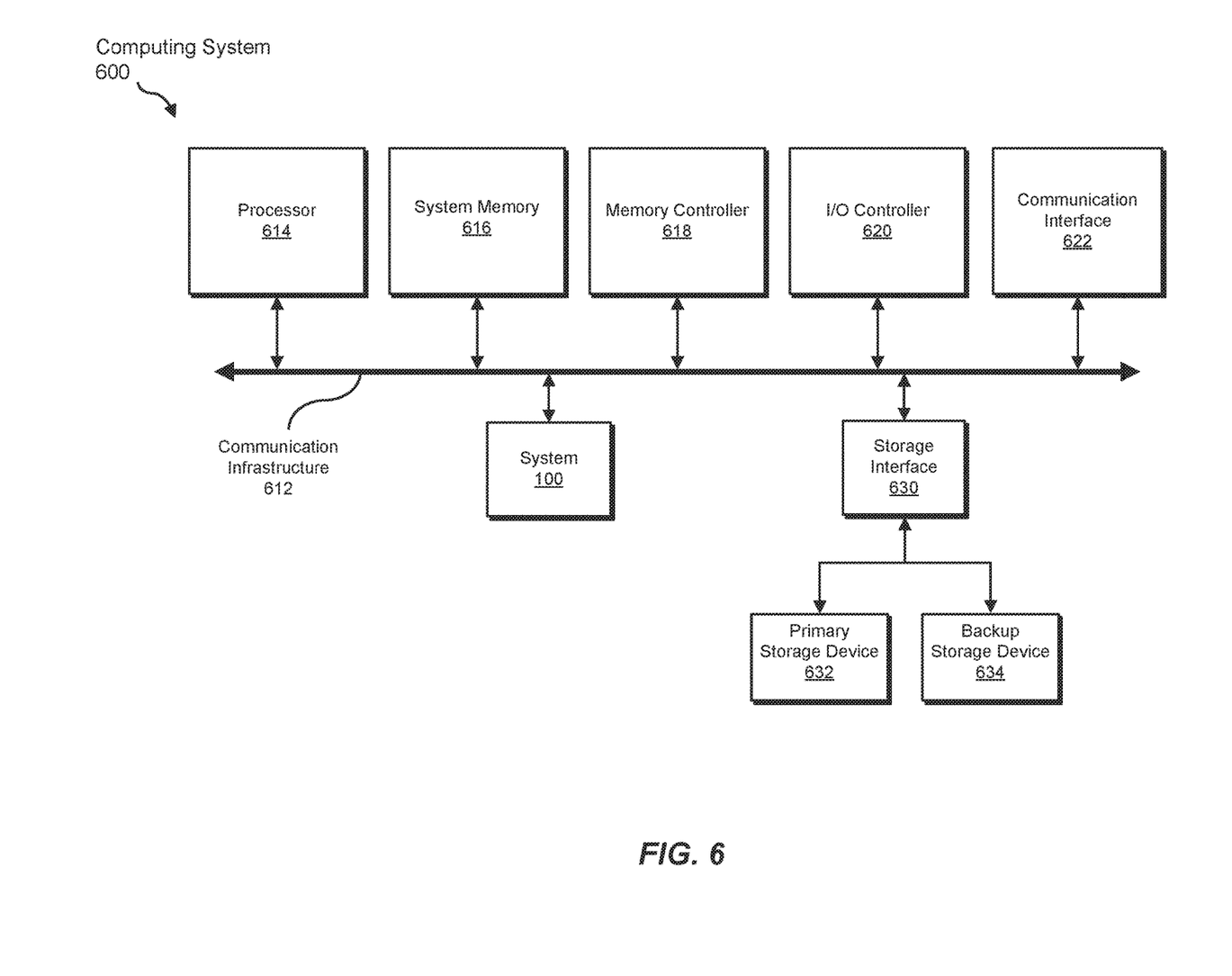
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying, within a virtual network:
      a primary virtual router; and
      a backup virtual router that is to forward traffic directed to the primary virtual router following a failure of the primary virtual router;
   installing, on the primary virtual router, a first virtual controller that manages the primary virtual router; and
   installing, on the backup virtual router, a second virtual controller that manages the backup virtual router;
   directing, by the first virtual controller, the second virtual controller to replicate a state of the primary virtual router within the backup virtual router such that the backup virtual router is configured to forward the traffic directed to the primary virtual router, wherein replicating the state of the primary virtual router within the backup virtual router comprises copying, from the primary virtual router to the backup virtual router, one or more operational settings or memory content that enable the backup virtual router to receive and forward the traffic directed to the primary virtual router;
   detecting, after the backup virtual router is configured, the failure of the primary virtual router; and
   in response to detecting the failure of the primary virtual router, directing, by the first virtual controller, the backup virtual router to begin forwarding the traffic directed to the primary virtual router.

2. The method of claim 1, further comprising directing, by the second virtual controller, the backup virtual router to be inactive within the virtual network until the failure of the primary virtual router is detected.

3. The method of claim 2, wherein directing the backup virtual router to begin forwarding the traffic directed to the primary virtual router comprises directing the second virtual controller to activate the backup virtual router within the virtual network.

4. The method of claim 1, wherein directing the second virtual controller to replicate the state of the primary virtual router comprises sending, to the second virtual controller, a system image of the primary virtual router.

5. The method of claim 1, wherein directing the second virtual controller to replicate the state of the primary virtual router comprises sending, to the second virtual controller, at least one of:
   a hardware profile of the primary virtual router; and
   a software profile of the primary virtual router.

6. The method of claim 1, wherein directing the second virtual controller to replicate the state of the primary virtual router comprises performing the replication of the state of the primary virtual router in response to detecting a bootup operation of the primary virtual router.

7. The method of claim 1, wherein directing the second virtual controller to replicate the state of the primary virtual router comprises performing the replication of the state of the primary virtual router in response to detecting a change in operational settings of the primary virtual router.

8. The method of claim 1, further comprising sending, from the first virtual controller to the second virtual controller, identification information of the primary virtual router that enables the backup virtual router to communicate with the primary virtual router.

9. The method of claim 1, further comprising enabling an administrator of the virtual network to manage network operations performed by the primary virtual router and the backup virtual router by providing the administrator access to an account that controls both the first virtual controller and the second virtual controller.

10. A system comprising:
an identification module, stored in memory, that identifies, within a virtual network:
a primary virtual router; and
a backup virtual router that is to forward traffic directed to the primary virtual router following a failure of the primary virtual router;
an installation module, stored in memory, that:
installs, on the primary virtual router, a first virtual controller that manages the primary virtual router; and
installs, on the backup virtual router, a second virtual controller on that manages the backup virtual router;
a replication module, stored in memory, that directs, by the first virtual controller, the second virtual controller to replicate a state of the primary virtual router within the backup virtual router such that the backup virtual router is configured to forward the traffic directed to the primary virtual router, wherein replicating the state of the primary virtual router within the backup virtual router comprises copying, from the primary virtual router to the backup virtual router, one or more operational settings or memory content that enable the backup virtual router to receive and forward the traffic directed to the primary virtual router;
a detection module, stored in memory, that detects, after the backup virtual router is configured, the failure of the primary virtual router;
a direction module, stored in memory, that directs, by the first virtual controller in response to the failure of the primary virtual router, the backup virtual router to begin forwarding the traffic directed to the primary virtual router; and
at least one hardware processor configured to execute the identification module, the installation module, the replication module, the detection module, and the direction module.

11. The system of claim 10, wherein the direction module further directs, as part of the second virtual controller, the backup virtual router to be inactive within the virtual network until the failure of the primary virtual router is detected.

12. The system of claim 11, wherein the direction module directs the backup virtual router to begin forwarding the traffic directed to the primary virtual router by directing the second virtual controller to activate the backup virtual router within the virtual network.

13. The system of claim 10, wherein the direction module directs the second virtual controller to replicate the state of the primary virtual router by sending, to the second virtual controller, a system image of the primary virtual router.

14. The system of claim 10, wherein the direction module directs the second virtual controller to replicate the state of the primary virtual router by sending, to the second virtual controller, at least one of:
a hardware profile of the primary virtual router; and
a software profile of the primary virtual router.

15. The system of claim 10, wherein the direction module directs the second virtual controller to replicate the state of the primary virtual router in response to detecting a bootup operation of the primary virtual router.

16. The system of claim 10, wherein the direction module directs the second virtual controller to replicate the state of the primary virtual router in response to detecting a change in operational settings of the primary virtual router.

17. The system of claim 10, wherein the replication module further sends, from the first virtual controller to the second virtual controller, identification information of the primary virtual router that enables the backup virtual router to communicate with the primary virtual router.

18. The system of claim 10, wherein the installation module further enables an administrator of the virtual network to manage network operations performed by the primary virtual router and the backup virtual router by providing the administrator access to an account that controls both the first virtual controller and the second virtual controller.

19. An apparatus comprising:
at least one storage device that facilitates execution of a primary virtual router within a virtual network;
at least one physical processing device communicatively coupled to the storage device, wherein the physical processing device:
identifies, within the virtual network, a backup virtual router that is to forward traffic directed to the primary virtual router following a failure of the primary virtual router;
installs, on the primary virtual router, a first virtual controller that manages the primary virtual router;
installs, on the backup virtual router, a second virtual controller that manages the backup virtual router;
directs, by the first virtual controller, the second virtual controller to replicate a state of the primary virtual router within the backup virtual router such that the backup virtual router is configured to forward the traffic directed to the primary virtual router, wherein replicating the state of the primary virtual router within the backup virtual router comprises copying, from the primary virtual router to the backup virtual router, one or more operational settings or memory content that enable the backup virtual router to receive and forward the traffic directed to the primary virtual router;
detects, after the backup virtual router is configured, the failure of the primary virtual router; and
in response to detecting the failure of the primary virtual router, directs, by the first virtual controller, the backup virtual router to begin forwarding the traffic directed to the primary virtual router.

20. The apparatus of claim 19, wherein the physical processing device further directs, by the second virtual controller, the backup virtual router to be inactive within the virtual network until the failure of the primary virtual router is detected.

* * * * *